United States Patent
Kim et al.

(10) Patent No.: US 11,923,697 B2
(45) Date of Patent: Mar. 5, 2024

(54) WIRELESS POWER TRANSMITTING APPARATUS AND METHOD FOR CONTROLLING WIRELESS POWER TRANSMITTING APPARATUS

(71) Applicant: Samsung Electronics Co., Ltd., Suwon-si (KR)

(72) Inventors: Mukyong Kim, Suwon-si (KR); Sangjin Jeong, Suwon-si (KR); Mijo Kang, Suwon-si (KR); Sunjin Kim, Suwon-si (KR); Kyungah Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 17/518,472

(22) Filed: Nov. 3, 2021

(65) Prior Publication Data

US 2022/0140659 A1    May 5, 2022

Related U.S. Application Data

(63) Continuation of application No. PCT/KR2021/015528, filed on Nov. 1, 2021.

(30) Foreign Application Priority Data

Nov. 4, 2020  (KR) .................. 10-2020-0146118

(51) Int. Cl.
*H02J 50/60* (2016.01)
*G01B 11/22* (2006.01)
(Continued)

(52) U.S. Cl.
CPC ............. *H02J 50/60* (2016.02); *G01B 11/22* (2013.01); *G01S 7/4813* (2013.01); *G01S 17/08* (2013.01);
(Continued)

(58) Field of Classification Search
None
See application file for complete search history.

(56) References Cited

U.S. PATENT DOCUMENTS

| 9,738,167 B2 | 8/2017 | Shimizu |
| 11,180,038 B2 | 11/2021 | Matsuo et al. |

(Continued)

FOREIGN PATENT DOCUMENTS

| JP | 2012257404 A | 12/2012 |
| JP | 2014107915 A | 6/2014 |

(Continued)

OTHER PUBLICATIONS

International Search Report and Written Opinion of the International Searching Authority dated Feb. 28, 2022, in connection with International Application No. PCT/KR2021/015528, 12 pages.

*Primary Examiner* — Daniel Kessie

(57) ABSTRACT

A provided wireless power transmitting apparatus includes a plate, a communication circuit configured to communicate with a wireless device positioned on an upper surface of the plate, a plurality of distance sensors provided around a driving area of the plate and configured to acquire data about a distance to an object positioned on the upper surface of the plate, a transmitting coil configured to transmit wireless power to the wireless device, and a controller configured to determine whether a foreign material is present between the plate and the wireless device based on the data about the distance and determine transmission of the wireless power based on whether the foreign material is present.

14 Claims, 14 Drawing Sheets

(51) Int. Cl.
*G01S 7/481* (2006.01)
*G01S 17/08* (2006.01)
*H02J 50/00* (2016.01)
*H02J 50/12* (2016.01)
*H02J 50/80* (2016.01)
*H02J 50/90* (2016.01)

(52) U.S. Cl.
CPC ............ *H02J 50/005* (2020.01); *H02J 50/12* (2016.02); *H02J 50/80* (2016.02); *H02J 50/90* (2016.02)

(56) References Cited

U.S. PATENT DOCUMENTS

| | | | |
|---|---|---|---|
| 2012/0242285 | A1 | 9/2012 | Jung et al. |
| 2016/0036241 | A1* | 2/2016 | Eckerson ............ H05B 6/1236 307/104 |
| 2018/0166929 | A1* | 6/2018 | Sawai ..................... G01V 3/10 |
| 2018/0205257 | A1* | 7/2018 | Kwon .................... H02J 50/12 |
| 2018/0212476 | A1* | 7/2018 | Nguyen ................. H02J 50/60 |
| 2018/0351369 | A1 | 12/2018 | Lee et al. |
| 2020/0156488 | A1* | 5/2020 | Tsukamoto ............. H02J 50/10 |
| 2020/0196399 | A1 | 6/2020 | Egenter et al. |
| 2020/0329435 | A1 | 10/2020 | Lee et al. |
| 2021/0268922 | A1* | 9/2021 | Oyaizu ................. B60L 53/122 |
| 2022/0396158 | A1 | 12/2022 | Urushibata et al. |

FOREIGN PATENT DOCUMENTS

| | | |
|---|---|---|
| JP | 6178409 B2 | 8/2017 |
| JP | 7020563 B2 | 2/2022 |
| JP | 7122688 B2 | 8/2022 |
| KR | 10-2012-0108340 A | 10/2012 |
| KR | 10-2013-0045883 A | 5/2013 |
| KR | 10-1317718 B1 | 10/2013 |
| KR | 10-1834385 B1 | 3/2018 |
| KR | 10-2018-0081639 A | 7/2018 |
| KR | 10-1980277 B1 | 5/2019 |
| KR | 10-2051682 B1 | 12/2019 |
| KR | 10-2067586 B1 | 1/2020 |
| KR | 10-2074475 B1 | 2/2020 |
| KR | 10-2127710 B1 | 6/2020 |
| KR | 10-2020-0120134 A | 10/2020 |

\* cited by examiner

WIRELESS POWER TRANSMITTING APPARATUS AND METHOD FOR CONTROLLING WIRELESS POWER TRANSMITTING APPARATUS

CROSS-REFERENCE TO RELATED APPLICATIONS

This application is a bypass continuation of International Application No. PCT/KR2021/015528, filed Nov. 1, 2021, which claims priority to Korean Patent Application No. 10-2020-0146118, filed Nov. 4, 2020, the disclosures of which are herein incorporated by reference in their entirety.

BACKGROUND

1. Field

The disclosed invention relates to a wireless power transmitting apparatus which is capable of supplying wireless power to a wireless device, and a method of controlling the wireless power transmitting apparatus.

2. Description of Related Art

Recently, technologies for supplying wireless power have been developed and applied to many electronic devices. Electronic devices to which wireless power transmission technologies are applied may wirelessly receive power without requiring a direct connection to a charging connector. For example, technologies have been developed to supply wireless power to various home appliances using products such as cooktops including an induction oven.

Wireless power transmission technologies include a magnetic induction method using a magnetic induction phenomenon between a primary coil and a secondary coil and a magnetic resonance method in which a primary coil and a secondary coil use the same frequency.

Meanwhile, when a foreign material such as a metal is present between a wireless power transmitting apparatus and a wireless device, energy loss and device damage may occur due to the foreign material. In addition, there may be a problem in that wireless power is not transmitted due to the foreign material.

SUMMARY

The disclosed invention is directed to providing a wireless power transmitting apparatus, which is capable of detecting a foreign material present between a wireless power transmitting apparatus and a wireless device, and a method of controlling the wireless power transmitting apparatus.

According to one embodiment of the present invention, a wireless power transmitting apparatus includes a plate, a communication circuit configured to communicate with a wireless device positioned on an upper surface of the plate, a plurality of distance sensors provided around a driving area of the plate and configured to acquire data about a distance to an object positioned on the upper surface of the plate, a transmitting coil configured to transmit wireless power to the wireless device, and a controller configured to determine whether a foreign material is present between the plate and the wireless device based on the data about the distance and determine transmission of the wireless power based on whether the foreign material is present.

When a distance value exceeding a preset reference distance is checked in the data about the distance, the controller may determine that the foreign material is present and may block the transmission of the wireless power.

The wireless power transmitting apparatus may further include a control panel including a display, wherein, when the foreign material is present, the control panel is controlled to output a request message to remove the foreign material.

The wireless power transmitting apparatus may further include a control panel including a display and a device sensor configured to detect a position of the wireless device, wherein, before a communication connection is made with the wireless device, the controller controls the control panel to output a notification message regarding a check for the foreign material based on a wakeup signal transmitted from the device sensor or the control panel.

When the communication circuit is connected to an external mobile device, the controller may control the communication circuit to transmit the notification message regarding the check for the foreign material to the external mobile device.

The wireless power transmitting apparatus may further include a level sensor configured to acquire first level data, wherein the controller acquires second level data from the wireless device through the communication circuit and further uses the first level data and the second level data to determine whether the foreign material is present.

When there is a difference between the first level data and the second level data, the controller may determine that the foreign material is present and may block the transmission of the wireless power.

The plurality of distance sensors may include a first distance sensor and a second distance sensor disposed to face each other, and the controller may alternately operate the first distance sensor and the second distance sensor.

Each of the plurality of distance sensors may include a light emitter configured to emit infrared light, a light receiver configured to receive reflected light from the object, a lens configured to refract the infrared light and the reflected light, a case disposed on the upper surface of the plate and configured to accommodate the light emitter, the light receiver, and the lens, and a protective cover provided to have an inclination or a curved surface between one surface of the case and the upper surface of the plate.

Each of the plurality of distance sensors may include a light emitter configured to emit infrared light, a light receiver configured to receive reflected light from the object, a lens configured to refract the infrared light and the reflected light, a support which is rotatably provided on the plate, on which the light emitter, the light receiver, and the lens are installed, and which has a bent rod shape, a step motor configured to rotate the support in a vertical direction passing through the plate, and a protective cover provided to have an inclination or a curved surface between both ends of the support.

When a communication connection is made with the wireless device, the controller may control the step motor to rotate the support in an upward direction, and when a standby mode is entered, the controller may control the step motor to rotate the support in a downward direction.

Each of the plurality of distance sensors may further include a rotation sensor provided at one end of the support and configured to detect a rotation state of the support.

The wireless power transmitting apparatus may further include a housing configured to accommodate the plate, the communication circuit, the transmitting coil, and the controller, a drip rail extending from an inner wall of the housing, and a drain hole formed in the inner wall of the housing.

The wireless power transmitting apparatus may further include a fan provided inside the housing, wherein the controller controls rotation of the fan to evaporate a liquid inside the housing.

According to one embodiment of the present invention, a method of controlling a wireless power transmitting apparatus includes performing a communication connection with a wireless device positioned on an upper surface of a plate, operating a plurality of distance sensors provided around a driving area of the plate, acquiring, by the plurality of distance sensors, data about a distance to an object positioned on the upper surface of the plate, determining whether a foreign material is present between the plate and the wireless device based on the data about the distance, and determining transmission of wireless power to the wireless device based on whether the foreign material is present.

The determining of whether the foreign material is present may include, when a distance value exceeding a preset reference distance is checked in the data about the distance, determining that the foreign material is present. The determining of the transmission of the wireless power may include blocking the transmission of the wireless power to the wireless device.

The method may further include, when the foreign material is present, controlling a control panel to output a request message to remove the foreign material.

The method may further include, before a communication connection is made with the wireless device, controlling the control panel to output a notification message regarding a check for the foreign material based on a wakeup signal transmitted from a device sensor or the control panel.

The method may further include acquiring, by a level sensor, first level data, and acquiring second level data from the wireless device, wherein the determining of whether the foreign material is present includes determining whether the foreign material is present by further using the first level data and the second level data.

The plurality of distance sensors may include a first distance sensor and a second distance sensor disposed to face each other, and the operating of the plurality of distance sensors may include alternately operating the first distance sensor and the second distance sensor.

According to the disclosed wireless power transmitting apparatus and method of controlling the wireless power transmitting apparatus, it is possible to detect a foreign material present between a wireless power transmitting apparatus and a wireless device, and it is possible to provide a notification regarding the foreign material. Therefore, it is possible to provide safe use guidance to a user.

In addition, according to the disclosed wireless power transmitting apparatus and method of controlling the wireless power transmitting apparatus, transmission of wireless power can be determined based on whether the foreign material is present between the wireless power transmitting apparatus and the wireless device. Accordingly, it is possible to prevent energy loss and device damage due to the foreign material.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
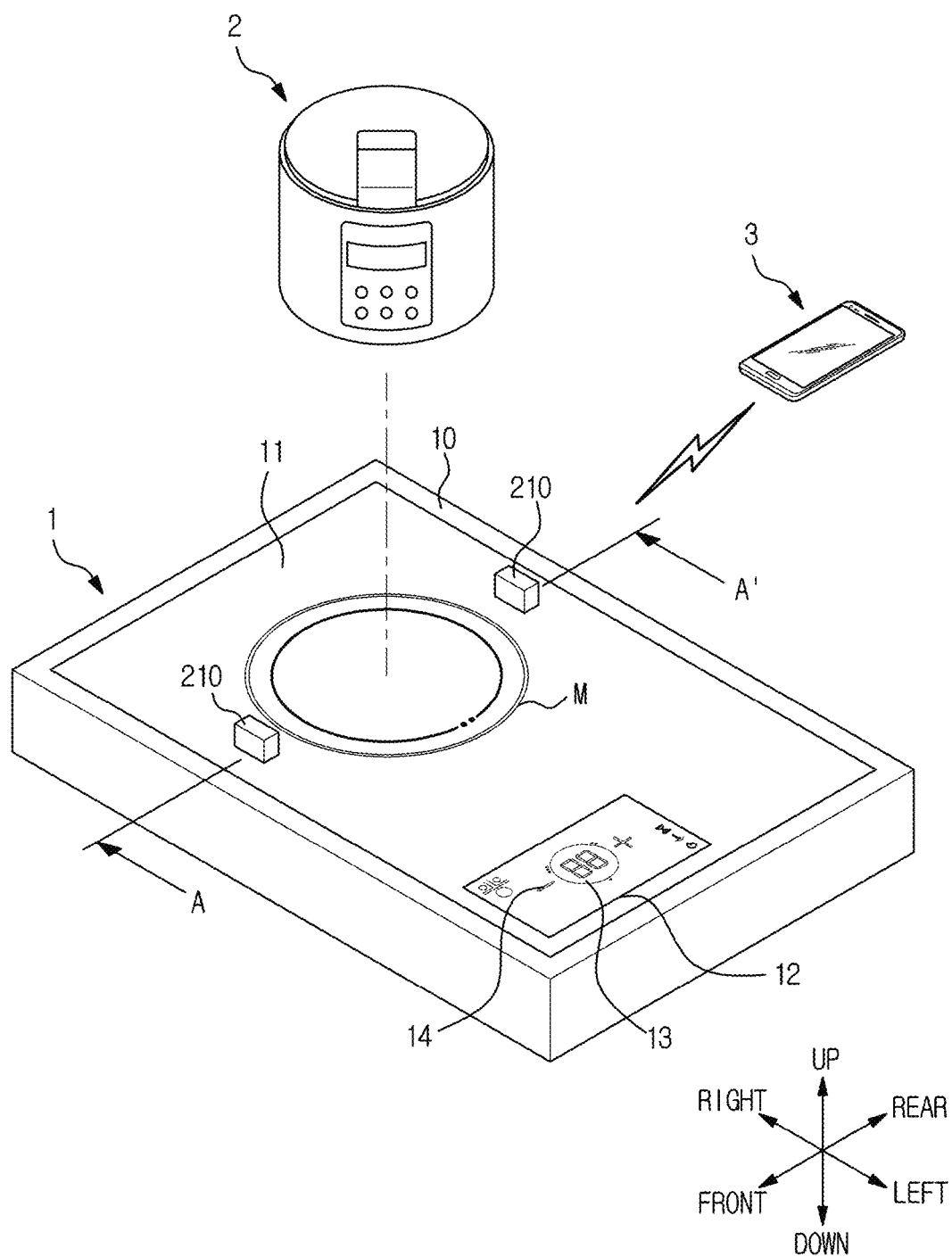
FIG. 1 illustrates an exterior of a wireless power transmitting apparatus according to one embodiment.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Like reference numerals refer to like elements throughout the specification. The present specification does not describe all elements of embodiments, and common knowledge in the technical field to which the present invention pertains or the same descriptions of the embodiments will be omitted. The term "unit," "module," "member," or "block" used herein may be implemented using hardware or software. According to the embodiments, one component may be implemented as a plurality of "units," "modules," "members," or "blocks," or one "unit," "module," "member," or "block" may include a plurality of components.

Throughout the specification, when a part is referred to as being "connected" to another part, it includes being "directly connected" and "indirectly connected through another component," and the term "indirectly connected" includes "connected through a wireless communication network" or "electrically connected through an electrical line."

In addition, the terms used in the specification are used to describe the embodiments and are not used to restrict or limit the disclosed invention. A single form of expression is meant to include multiple elements unless otherwise stated. It will be further understood that the term "comprise," "include," or "have," when used herein, is used to describe the presence of stated features, numbers, steps, operations, elements, components, and/or combinations thereof but is not used to exclude other features or elements being further included.

In addition, in the specification, terms including ordinal numbers such as "first" and "second" are used to distinguish a plurality of components, and the used ordinal numbers do not indicate the arrangement order, manufacturing order, or importance between the components. A term "and/or" includes a combination of a plurality of associated disclosed items or any item of the plurality of associated disclosed items. Hereinafter, embodiments of the disclosed invention will be described in detail.

FIG. 1 illustrates an exterior of a wireless power transmitting apparatus according to one embodiment.

Referring to FIG. 1, a driving area M in which a wireless device 2 may receive wireless power may be provided on an upper surface of a plate 11. The driving area M may be provided at a position corresponding to a transmitting coil 21 to be described below. Although one driving area M is illustrated in FIG. 1, a plurality of driving areas may be provided, and a plurality of transmitting coils corresponding to the plurality of driving areas may be provided.

A wireless power transmitting apparatus 1 may supply wireless power to the wireless device 2 capable of receiving wireless power. When the wireless device 2 is positioned in the driving area M provided on the plate 11 of the wireless power transmitting apparatus 1, the wireless power transmitting apparatus 1 may transmit wireless power to the wireless device 2. Although the wireless device 2 is exemplified as an electric rice cooker, the wireless device 2 may include various electronic devices. For example, the wireless device 2 may be an electric blender, an electric toaster, an electric kettle, or a coffee maker. In addition, a bottom surface of the wireless device 2 in contact with the plate 11 may be formed as a flat surface.

The wireless power transmitting apparatus 1 may transmit wireless power to the wireless device 2 using a wireless power transmission technology that uses a magnetic induction or magnetic resonance method. The magnetic induction method is a method in which a magnetic field of the transmitting coil 21 is changed to induce a voltage in a receiving coil 410, thereby allowing a current to flow in a secondary coil. The magnetic resonance method is a method in which a resonance phenomenon is generated in the transmitting coil 21 and the receiving coil 410 using the same resonant frequency, thereby transmitting power through the resonance phenomenon.

In addition, when a cooking vessel is positioned in the driving area M provided on the plate 11 of the wireless power transmitting apparatus 1, the cooking vessel may be heated by a magnetic or electromagnetic field generated by the transmitting coil 21.

In addition, the wireless power transmitting apparatus 1 may be connected to an external mobile device 3. The wireless power transmitting apparatus 1 may be connected to the external mobile device 3 using wireless communication. When the wireless power transmitting apparatus 1 is connected to the external mobile device 3, information about an operation of the wireless power transmitting apparatus 1 may be transmitted to the external mobile device 3. In addition, the wireless power transmitting apparatus 1 may be controlled using the external mobile device 3. In other words, a user may control the wireless power transmitting apparatus 1 using the external mobile device 3.

The wireless power transmitting apparatus 1 may include a housing 10 and the plate 11. The housing 10 and the plate 11 may be made of various materials. For example, the plate 11 may be made of tempered glass such as ceramic glass.

A control panel 12 capable of receiving a control command from the user and displaying information about an operation of the wireless power transmitting apparatus 1 may be provided on the plate 11. For example, the user may input a wakeup command of the wireless power transmitting apparatus 1 and set an operation time using the control panel 12.

The control panel 12 may include a display and an inputter. The inputter may include at least one of a physical button, a touch button, a touch pad, a knob, a jog shuttle, an operating stick, a track ball, and a track pad. In addition, the control panel 12 may be provided as a touch screen in which the display and the inputter are integrally implemented.

Although the control panel 12 is illustrated in FIG. 1 as being provided on the upper surface of the plate 11, the control panel 12 may be provided at any one of various positions of the wireless power transmitting apparatus 1. For example, the control panel 12 may be provided on a front surface, a rear surface, a left surface, or a right surface of the wireless power transmitting apparatus 1.

A plurality of distance sensors 210 may be provided around the driving area M of the plate 11. Although the plurality of distance sensors 210 are illustrated in FIG. 1 as being positioned to face each other, the plurality of distance sensors 210 may be provided at various positions around the driving area M. One of two distance sensors 210 illustrated in FIG. 1 may be referred to as a first distance sensor, and the other thereof may be referred to as a second distance sensor. Since the illustrated two distance sensors 210 are merely examples, more distance sensors 210 may be provided.

When the first distance sensor and the second distance sensor are positioned to face each other, the first distance sensor and the second distance sensor may be alternately operated. When the plurality of distance sensors 210 facing each other are simultaneously operated, crosstalk of infrared light may occur. Crosstalk of light can be prevented by alternately operating the plurality of distance sensors 210.

Each of the plurality of distance sensors 210 may acquire data about a distance to an object positioned on the upper surface of the plate 11. For example, the distance sensor 210 may be implemented as a time-of-flight (TOF) sensor. The distance sensor 210 may emit infrared light, receive light reflected from an object, and acquire data about a distance to the object based on a reception time of the reflected light. In other words, the distance sensor 210 may acquire three-dimensional depth information. In addition, as will be described below, the distance sensor 210 may be provided as a fixed type or a rotation type. Data about a distance acquired by the distance sensor 210 may be used to determine whether a foreign material is present between the wireless device 2 and the plate 11.

Meanwhile, although not shown in the drawings, a wiper (not shown) for removing a foreign material may be provided on the plate 11 of the wireless power transmitting apparatus 1. When it is detected that a foreign material is present on the upper surface of the plate 11, a controller 330 of the wireless power transmitting apparatus 1 may operate the wiper (not shown) such that the foreign material is automatically removed. The wiper (not shown) may operate by being lifted from the inside of the plate 11 to the upper surface of the plate 11.

Figure 2:
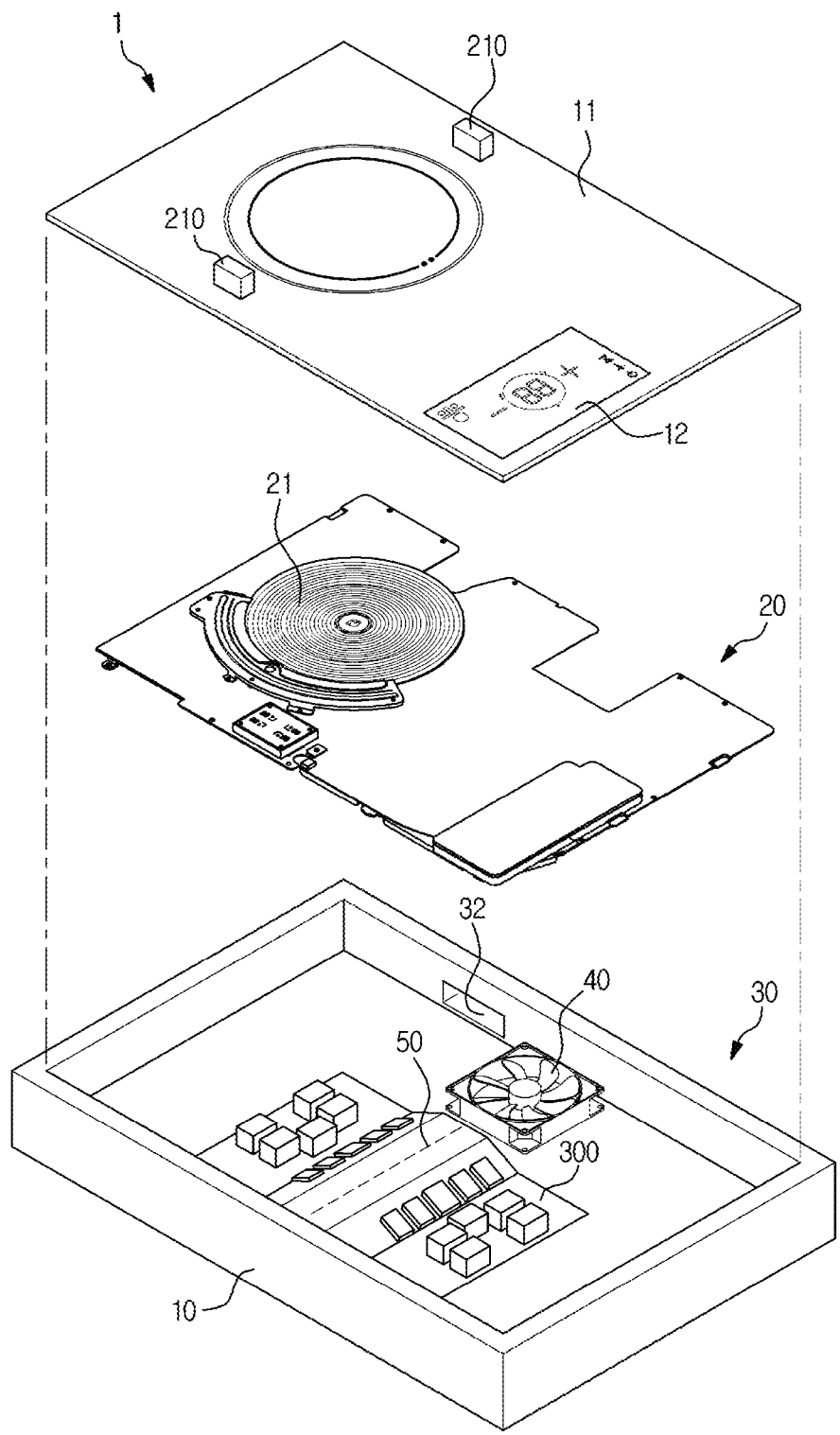
FIG. 2 illustrates the inside of the wireless power transmitting apparatus according to one embodiment.

FIG. 2 illustrates the inside of the wireless power transmitting apparatus according to one embodiment.

Referring to FIG. 2, the wireless power transmitting apparatus 1 may include a coil layer 20 and a driving layer 30 which are provided under the plate 11. In addition, the coil layer 20 and the driving layer 30 may be provided inside the plate 11. The coil layer 20 may be provided under the plate 11 or inside the plate 11 and may include one or more transmitting coils 21. Although one transmitting coil 21 is illustrated in FIG. 2, the plurality of transmitting coils 21 may be provided. In addition, the coil layer 20 may be accommodated in the housing 10.

The transmitting coil 21 may generate a magnetic field and/or an electromagnetic field based on a current applied from the driving circuit 320 and may transmit wireless power to the wireless device 2. When the plurality of transmitting coils 21 are provided, each of the transmitting coils 21 may be independently driven.

The driving layer 30 may include the housing 10, a fan 40, a heat sink 50, and a driving assembly 300. The fan 40, the heat sink 50, and the driving assembly 300 may be accommodated in the housing 10. Meanwhile, when the distance sensor 210 is provided as the rotation type to be described below, a drain hole 32 may be provided in an inner wall of the housing 10.

The fan 40 may circulate heat inside the housing 10 and may serve to dissipate the heat inside the housing 10 to the outside of the wireless power transmitting apparatus 1. The heat sink 50 may radiate heat generated in the driving assembly 300. The controller 330 may control the rotation of the fan 40.

Figure 3:
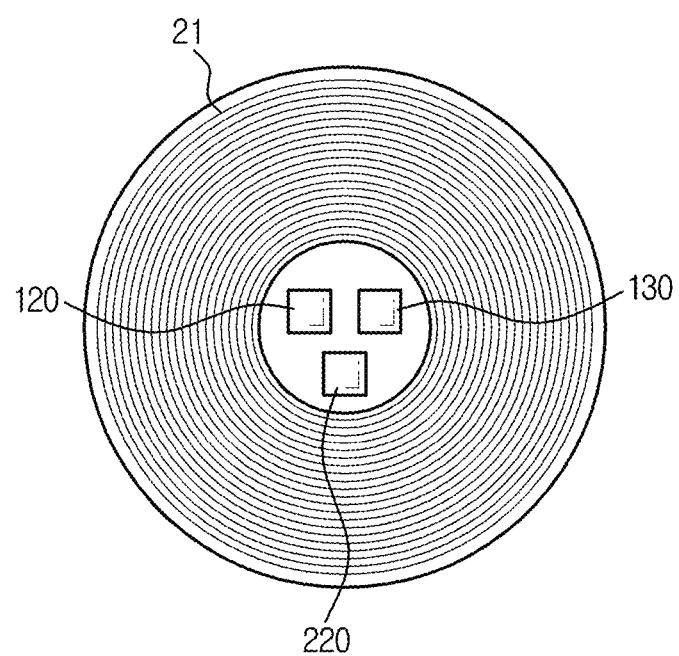
FIG. 3 illustrates a transmitting coil, a device sensor, a temperature sensor, and a level sensor included in the wireless power transmitting apparatus according to one embodiment.

The driving assembly 300, as shown in FIG. 3, may include a communication circuit 310, a driving circuit 320, and the controller 330. The driving circuit 320 may apply a current to the transmitting coil 21. The controller 330 may be electrically connected to components of the wireless power transmitting apparatus 1 and may control an operation of each of the components. The controller 330 may include a control circuit. The driving assembly 300 may include a printed circuit board, and the communication circuit 310, the driving circuit 320, and the controller 330 may be installed on one printed circuit board or installed on a plurality of printed circuit boards.

FIG. 3 illustrates a transmitting coil 21, a device sensor 120, a temperature sensor 130, and a level sensor 220 included in the wireless power transmitting apparatus according to one embodiment.

Referring to FIG. 3, the wireless power transmitting apparatus 1 may include a device sensor 120 and a temperature sensor 130 and further include a level sensor 220. The device sensor 120, the temperature sensor 130, and the level sensor 220 may be provided on the coil layer 20. For example, the device sensor 120, the temperature sensor 130, and the level sensor 220 may be positioned at a central portion of the transmitting coil 21. In addition, the device sensor 120, the temperature sensor 130, and the level sensor 220 may be positioned around the transmitting coil 21. Meanwhile, the level sensor 220 may be provided at any one of various positions of the wireless power transmitting apparatus 1.

The device sensor 120 may detect the wireless device 2 placed in the driving area M of the plate 11. The device sensor 120 may detect a position of the wireless device 2 placed on the plate 11. The device sensor 120 may include a capacitive sensor capable of detecting a change in capacitance caused by the wireless device 2. In addition, the device sensor 120 may include at least one of an infrared sensor, a weight sensor, a micro switch, and a membrane switch. In addition, the device sensor 120 may include various sensors.

In certain embodiments, the device sensor 120 may be omitted. In this case, the controller 330 may detect the position of the wireless device 2 based on an inductance of the transmitting coil 21 which is changed by the wireless device 2 placed in the driving area M.

The temperature sensor 130 may measure at least one of a temperature of the transmitting coil 21, a temperature of the plate 11, a temperature of the heat sink 50, and an internal temperature of the housing 10. The temperature sensor 130 may include a thermistor of which an electrical resistance value is changed according to a temperature. The temperature sensor 130 may transmit temperature data to the controller 330, and the controller 330 may determine whether overheating occurs based on the temperature data. When the transmitting coil 21 and the plate 11 are overheated, the controller 330 may control the driving circuit 320 to stop wireless power from being transmitted by the transmitting coil 21.

The level sensor 220 may acquire level data of the wireless power transmitting apparatus 1. Specifically, the level sensor 220 may detect a degree to which the wireless power transmitting apparatus 1 is inclined. The level sensor 220 may measure an inclination of the wireless power transmitting apparatus 1 with respect to the direction of gravity. In addition, the level sensor 220 may measure an inclination of the wireless power transmitting apparatus 1 with respect to a surface (for example, a table) on which the wireless power transmitting apparatus 1 is placed and may measure an inclination of the wireless power transmitting apparatus 1 with respect to a ground surface. The level sensor 220 may include at least one of a gyro sensor and an acceleration sensor.

The level sensor 220 may transmit the level data to the controller 330, and the controller 330 may determine whether a foreign material is present between the wireless power transmitting apparatus 1 and the wireless device 2 based on the level data. The level sensor 220 of the wireless power transmitting apparatus 1 may be referred to as a first level sensor, and the level data acquired by the level sensor 220 may be referred to as first level data. The level sensor 220 may be an additional component.

Figure 4:
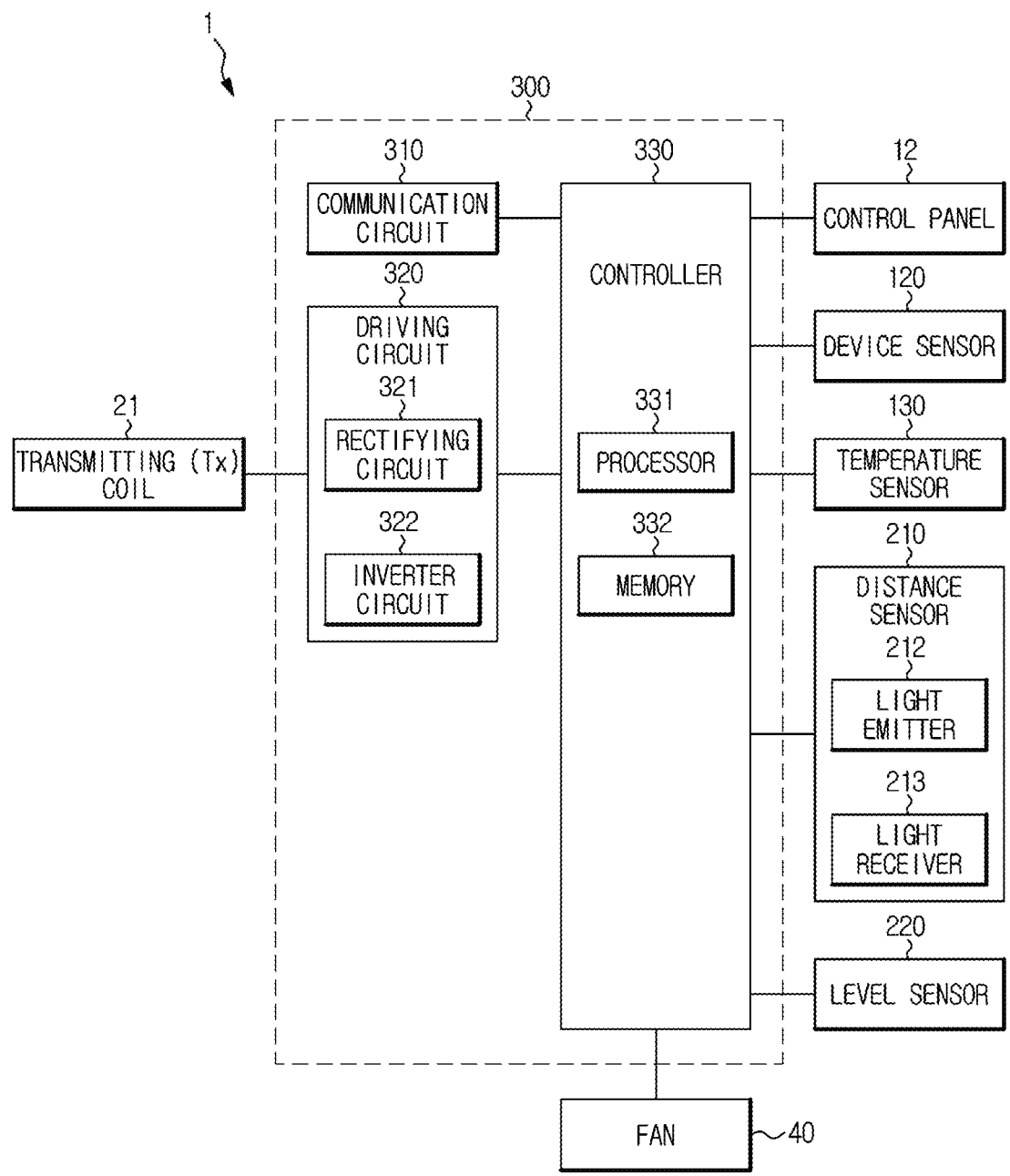
FIG. 4 is a control block diagram of a wireless power transmitting apparatus according to one embodiment.

FIG. 4 is a control block diagram of a wireless power transmitting apparatus according to one embodiment.

Referring to FIG. 4, a wireless power transmitting apparatus 1 according to one embodiment may include a control panel 12, a transmitting coil 21, a fan 40, a device sensor 120, a temperature sensor 130, a distance sensor 210, and a driving assembly 300. In addition, the wireless power transmitting apparatus 1 may further include a level sensor 220. The driving assembly 300 may include a communication circuit 310, a driving circuit 320, and a controller 330. The transmitting coil 21 may be driven by a current applied according to an operation of the driving circuit 320. The controller 330 may be electrically connected to components of the wireless power transmitting apparatus 1 and control an operation of each component.

When the device sensor 120 detects a wireless device 2, the device sensor 120 may transmit a wakeup signal to the controller 330. In addition, when a user input is input through a power-on button of the control panel 12, the control panel 12 may transmit a wakeup signal to the controller 330. The controller 330 may turn power of the wireless power transmitting apparatus 1 on or convert the wireless power transmitting apparatus 1 from a standby mode to an operation mode based on the wakeup signal. In addition, the controller 330 may control the control panel 12 to output a notification message regarding a check for a foreign material based on the wakeup signal transmitted from the device sensor 120 or the control panel 12.

When the communication circuit 310 is connected to an external mobile device 3, the controller 330 may control the communication circuit 310 to transmit a notification message regarding a check for a foreign material to the external mobile device 3. A notification regarding a check for a foreign material is provided to a user upon initial operation of the wireless power transmitting apparatus 1, thereby guiding safe use.

In certain embodiments, the device sensor 120 may be omitted. In this case, the controller 330 may serve as the device sensor 120. The controller 330 may detect a position of the wireless device 2 based on an inductance of the transmitting coil 21 which is changed by the wireless device 2 placed in a driving area M. An inductance of the transmitting coil 21 measured when the wireless device 2 is placed in the driving area M is different from an inductance of the transmitting coil 21 measured when the wireless device 2 is not present. The controller 330 may control the driving circuit 320 to apply a detection current for detecting the wireless device 2 to the transmitting coil 21. In addition, the wireless device 2 may be detected through various methods.

In addition, the controller 330 may generate a wakeup signal based on the detection of the wireless device 2 and may control the control panel 12 to output a notification message regarding a check for a foreign material based on the wakeup signal.

The distance sensor 210 may be provided around the driving area M of a plate 11. The distance sensor 210 may acquire data about a distance to an object positioned on an upper surface of the plate 11. For example, the distance sensor 210 may be implemented as a TOF sensor. The distance sensor 210 may emit infrared light, receive light reflected from an object, and acquire data about a distance to the object based on a reception time of the reflected light. In other words, the distance sensor 210 may acquire three-dimensional depth information.

The distance sensor 210 basically includes a light emitter 212 which emits infrared light, a light receiver 213 which receives light reflected from an object, and lenses 214 and 217 which refract infrared light and reflected light. The lenses 214 and 217 may be made of a transparent material and may be implemented using a material having high light transmittance. Angles of the lenses 214 and 217 may be adjusted automatically or manually. In addition, the distance sensor 210 may include protective covers 215 and 218 which prevent the attachment of foreign materials and the permeation of liquid. A structure of the distance sensor 210 will be described in detail below.

The distance sensor 210 may be provided as a fixed type or a rotation type. The distance sensor 210 that is the fixed type will be described with reference FIG. 12, and the distance sensor 210 that is the rotation type will be described with reference to FIGS. 13 and 14.

The controller 330 may determine whether a foreign material is present between the plate 11 and the wireless device 2 based on data about a distance acquired by the distance sensor 210 and may determine transmission of (e.g., whether to transmit) wireless power based on whether the foreign material is present. That is, when the foreign material is present between the plate 11 and the wireless device 2, the transmission of the wireless power may be blocked. Specifically, when a distance value exceeding a preset reference distance is checked in the data about the distance, the controller 330 may determine that the foreign material is present.

The communication circuit 310 may communicate with the wireless device 2. In addition, the communication circuit 310 may communicate with the external mobile device 3. The communication circuit 310 may be implemented using various wireless communication technologies. For example, at least one of radio frequency (RF) communication, infrared communication, Wi-Fi, Bluetooth, ZigBee, and near field communication (NFC) may be applied to the communication circuit 310. The communication circuit 310 may be an NFC circuit. The NFC circuit may communicate with an NFC tag included in the wireless device 2. The NFC circuit may operate as a tag or a reader depending on the situation. Since NFC is bidirectional communication, the NFC is different from radio frequency identification (RFID) which uses unidirectional communication.

The communication circuit 310 may transmit or receive data to or from the wireless device 2. For example, the communication circuit 310 may receive data about a state of the wireless device 2. The controller 330 may determine whether the wireless device 2 is in an operation mode or a standby mode based on data received from the wireless device 2 through the communication circuit 310. The communication circuit 310 of the wireless power transmitting apparatus 1 may be referred to as a first communication circuit.

The driving circuit 320 may receive power from an external power supply, rectify the received power, and supply the rectified power to the transmitting coil 21 and the controller 330. In addition, the controller 330 may distribute the power transmitted from the driving circuit 320 to the control panel 12, the fan 40, the device sensor 120, the temperature sensor 130, the distance sensor 210, the level sensor 220, and the communication circuit 310. Alternatively, the driving circuit 320 may directly supply the rectified power to each of the transmitting coil 21, the controller 330, the control panel 12, the fan 40, the device sensor 120, the temperature sensor 130, the distance sensor 210, the level sensor 220, and the communication circuit 310.

Specifically, the driving circuit 320 may include a rectifying circuit 321 and an inverter circuit 322. The rectifying circuit 321 may convert alternating current (AC) power into direct current (DC) power. The rectifying circuit 321 may convert an AC voltage, of which a magnitude and polarity (positive voltage or negative voltage) are changed over time, into a DC voltage having a constant magnitude and polarity and may convert an AC current, of which a magnitude and direction (positive current or negative current) are changed over time, into a DC current having a constant magnitude.

The rectifying circuit 321 may include a bridge diode. The rectifying circuit 321 may include four diodes. Two diodes may be connected in series to form a diode pair, and two diode pairs may be connected in parallel with each other. The bridge diode may convert an AC voltage, of which a polarity is changed over time, into a positive voltage having a constant polarity and may convert an AC current, of which a direction is changed over time, into a positive current having a constant direction.

In addition, the rectifying circuit 321 may include a DC link capacitor. The DC link capacitor may convert a positive voltage, of which a magnitude is changed over time, into a DC voltage having a constant magnitude. The DC link capacitor may maintain and supply the converted DC voltage to the inverter circuit 322.

The inverter circuit 322 may allow a current to flow in the transmitting coil 21 by switching a voltage applied to the transmitting coil 21. The inverter circuit 322 may include a switching circuit, which supplies a current to the transmitting coil 21 or blocks the current, and a resonance capacitor. The switching circuit may include two switch elements. One end of the transmitting coil 21 is connected to a connection point of the switch element, and the other end of the transmitting coil 21 is connected to the resonance capacitor. The switch element may be switched on or off according to a control signal of the controller 330. A current and a voltage may be applied to the transmitting coil 21 due to an (on/off) switching operation of the switch element.

The resonance capacitor may be provided as two resonance capacitors and may serve as a buffer. The resonance capacitor affects energy loss by controlling a saturation voltage rise rate while the switch element is switched off. In addition, the resonance capacitor determines a resonance frequency of the transmitting coil 21.

Since the switch element is switched on or off at a high speed, the switching element may be implemented as a three-terminal semiconductor element switch having a fast response speed. For example, the switch element may be a bipolar junction transistor (BJT), a metal-oxide-semiconductor field effect transistor (MOSFET), an insulated gate bipolar transistor (IGBT), or a thyristor.

The transmitting coil 21 forms a magnetic field using a current applied from the inverter circuit 322. Due to the magnetic field, a current and a voltage may be applied to a receiving coil 410 of the wireless device 2 positioned in the driving area M of the plate 11.

The controller 330 may include a processor 331 and a memory 332. The memory 332 may store programs, instructions, and data for controlling an operation of the wireless power transmitting apparatus 1. The processor 331 may generate a control signal for controlling an operation of the wireless power transmitting apparatus 1 based on the programs, instructions, and data recorded and/or stored in the memory 332. The controller 330 may be implemented as a control circuit in which the processor 331 and the memory 332 are mounted. In addition, the controller 330 may include a plurality of processors and a plurality of memories. The controller 330 of the wireless power transmitting apparatus 1 may be referred to as a first controller.

The processor 331 may include a logic circuit and an arithmetic circuit as hardware. The processor 331 may process data according to programs and/or instructions provided from the memory 332 and generate a control signal according to a processing result.

The memory 132 may include a volatile memory for temporarily recording data, such as a static random access memory (SRAM) or a dynamic random access memory (DRAM), and a nonvolatile memory for storing data for a long time, such as a read only memory, an erasable programmable read only memory (EPROM), or an electrically erasable programmable read only memory (EEPROM).

In addition, the wireless power transmitting apparatus 1 may further include other components.

Figure 5:
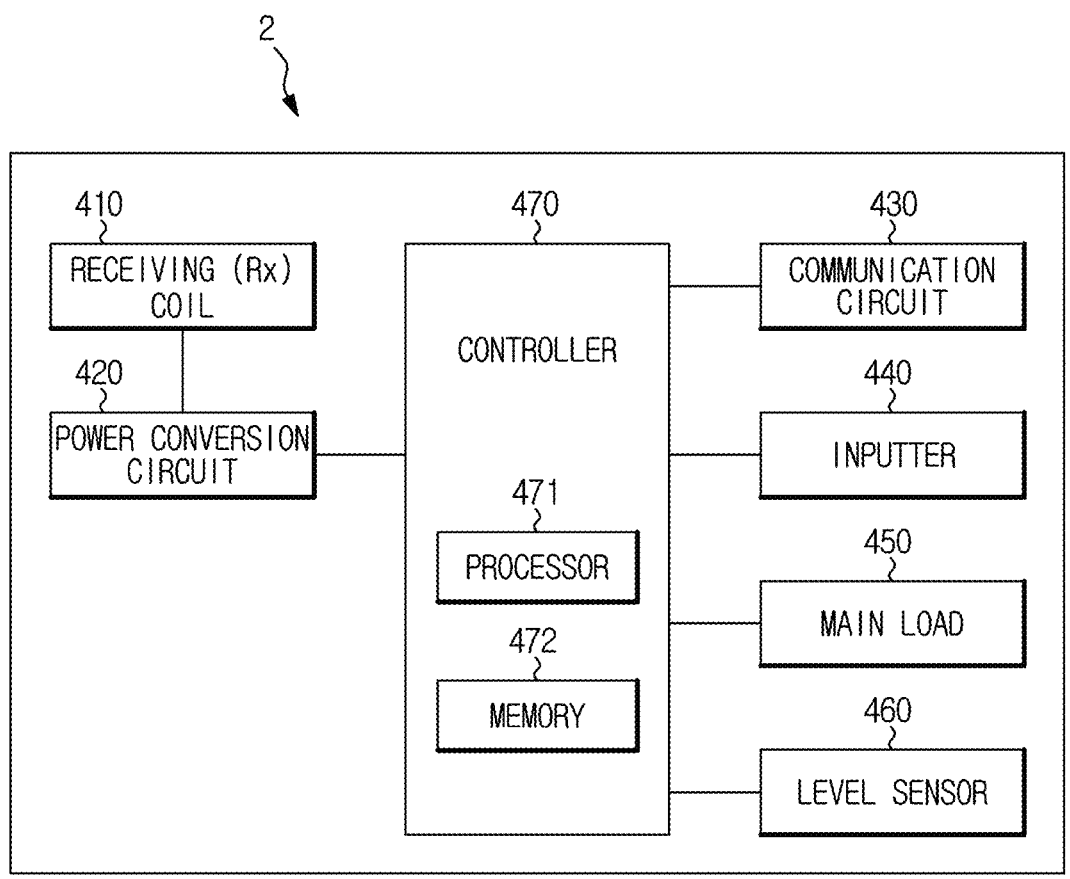
FIG. 5 is a control block diagram of a wireless device according to one embodiment.

FIG. 5 is a control block diagram of a wireless device.

Referring to FIG. 5, a wireless device 2 may include a receiving coil 410, a power conversion circuit 420, a communication circuit 430, an inputter 440, a main load 450, a level sensor 260, and a controller 470. The receiving coil 410 and the power conversion circuit 420 may supply power to the communication circuit 430, the inputter 440, the main load 450, the level sensor 460, and the controller 470.

The receiving coil 410 may receive power from a transmitting coil 21 of a wireless power transmitting apparatus 1. When the wireless device 2 is disposed in a driving area M provided on a plate 11 of the wireless power transmitting apparatus 1, the receiving coil 410 receives power due to electromagnetic induction.

The power conversion circuit 420 may include a rectifying circuit. An AC voltage and an AC current may be applied to the receiving coil 410 which receives power from the transmitting coil 21. However, since the communication circuit 430, the inputter 440, the main load 450, the level sensor 460, and the controller 470 of the wireless device 2 require DC power, the power conversion circuit 420 is required. In addition, the power conversion circuit 420 may include a DC-to-DC converter for applying appropriate power to each component of the wireless device 2. The power conversion circuit 420 may be implemented as a switched-mode power supply (SMPS). The SMPS is a power supply device which converts and supplies AC power or DC power through a switching operation.

The communication circuit 430 may communicate with the wireless power transmitting apparatus 1. The communication circuit 430 may be implemented using various wireless communication technologies. For example, at least one of RF communication, infrared communication, Wi-Fi, Bluetooth, ZigBee, and NFC may be applied to the communication circuit 430. The communication circuit 430 may be implemented as an NFC tag. The communication circuit 430 of the wireless device 2 may be referred to as a second communication circuit.

The inputter 440 may receive a command regarding an operation of the wireless device 2 from a user. The inputter 440 may include at least one of a physical button, a touch button, and a dial. In addition, the inputter 440 may be implemented as a touch screen.

The main load 450 refers to a component that consumes the most power in the wireless device 2. For example, when the wireless device 2 is a toaster, the main load 450 may be a heat source such as a heater. When the wireless device 2 is a blender, the main load 450 may be a motor.

The level sensor 460 may acquire level data of the wireless device 2. The level sensor 460 of the wireless device 2 may be referred to as a second level sensor, and the level data acquired by the level sensor 460 of the wireless device 2 may be referred to as second level data. The level sensor 460 may transmit the level data to the controller 470 of the wireless device 2, and the controller 470 may control the communication circuit 430 to transmit the level data to the wireless power transmitting apparatus 1.

The wireless power transmitting apparatus 1 may determine whether a foreign material is present between the plate 11 and the wireless device 2 using the level data. Specifically, a controller 330 of the wireless power transmitting apparatus 1 may determine whether the foreign material is present using first level data acquired by a level sensor 220 of the wireless power transmitting apparatus 1 and the second level data acquired by the level sensor 460.

The controller 470 may be electrically connected to components of the wireless device 2 and may control each component. That is, the controller 470 may control the power conversion circuit 420, the communication circuit 430, the inputter 440, and the main load 450. The controller 470 may include a processor 471 and a memory 472. The controller 470 of the wireless device 2 may be referred to as a second controller.

Meanwhile, the wireless device 2 may further include an auxiliary coil (not shown). When the wireless device 2 receives wireless power, the controller 470 of the wireless device 2 may determine whether a foreign material is present between the wireless device 2 and the plate 11 of the wireless power transmitting apparatus 1 using a current value applied to the auxiliary coil (not shown) and a pre-stored operating current table. The operating current table includes operating current values according to a load of the wireless device 2. The load of the wireless device 2 may vary according to a type of the wireless device 2 and may also vary according to an operation state of the wireless device 2. When there is a difference between the current value applied to the auxiliary coil (not shown) and the operating current value of the operating current table, the controller 470 of the wireless device 2 may determine that the foreign material is present between the wireless device 2 and the plate 11 of the wireless power transmitting apparatus 1. The controller 470 of the wireless device 2 may control the communication circuit 430 to transmit a signal regarding whether the foreign material is present to the wireless power transmitting apparatus 1.

Hereinafter, an operation of a wireless power transmitting apparatus according to one embodiment will be described in more detail.

Figure 6:
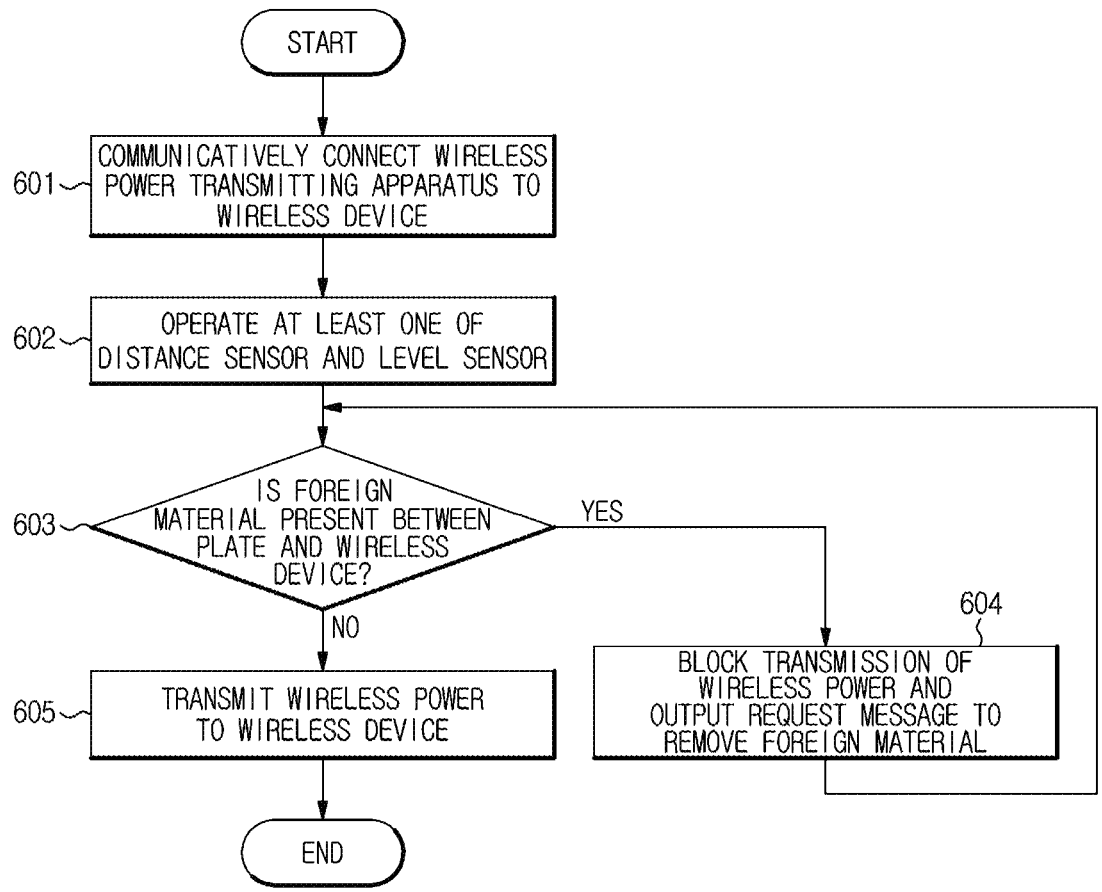
FIG. 6 is a flowchart for describing a method of controlling a wireless power transmitting apparatus according to one embodiment.

FIG. 6 is a flowchart for describing a method of controlling a wireless power transmitting apparatus according to one embodiment.

Referring to FIG. 6, when a wireless power transmitting apparatus 1 is communicatively connected to a wireless device 2 (601), a controller 330 of the wireless power transmitting apparatus 1 may operate at least one of a distance sensor 210 and a level sensor 220 (602). For example, when the wireless power transmitting apparatus 1 includes both the distance sensor 210 and the level sensor 220, according to settings, only the distance sensor 210 may be operated, only the level sensor 220 may be operated, or the distance sensor 210 and the level sensor 220 may be operated together.

The controller 330 of the wireless power transmitting apparatus 1 may determine whether a foreign material is present between a plate 11 and the wireless device 2 based on at least one of data about a distance acquired by the distance sensor 210 or level data acquired by the level sensor 220 (603). When the foreign material is present between the plate 11 and the wireless device 2, the controller 330 of the wireless power transmitting apparatus 1 may control a control panel 12 to block transmission of wireless power and output a request message to remove the foreign material (604). On the contrary, when the foreign material is not present between the plate 11 and the wireless device 2, the controller 330 may control a driving circuit 320 to transmit wireless power to the wireless device 2 (605).

Figure 7:
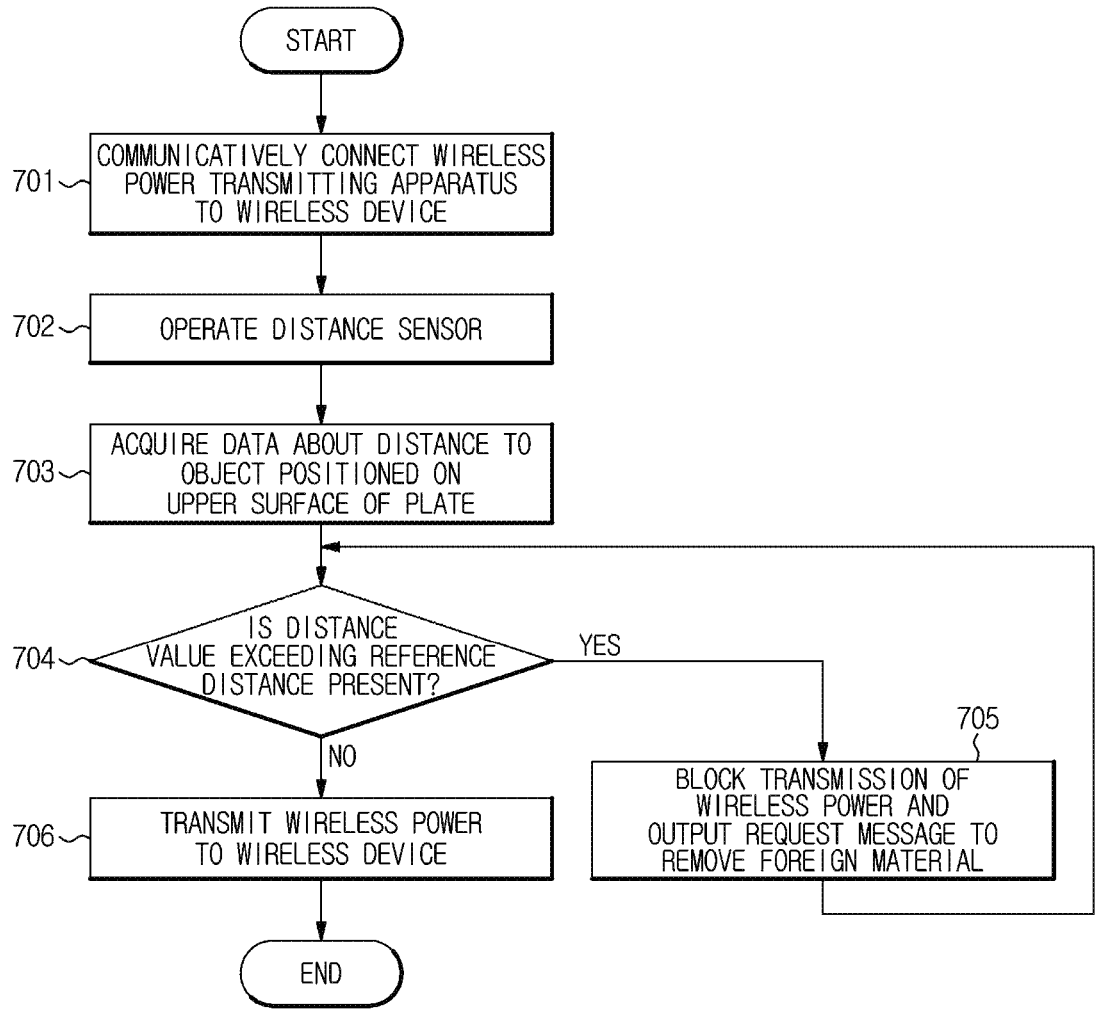
FIG. 7 is a flowchart for describing a method of controlling a wireless power transmitting apparatus using a distance sensor according to one embodiment.
Figure 8:
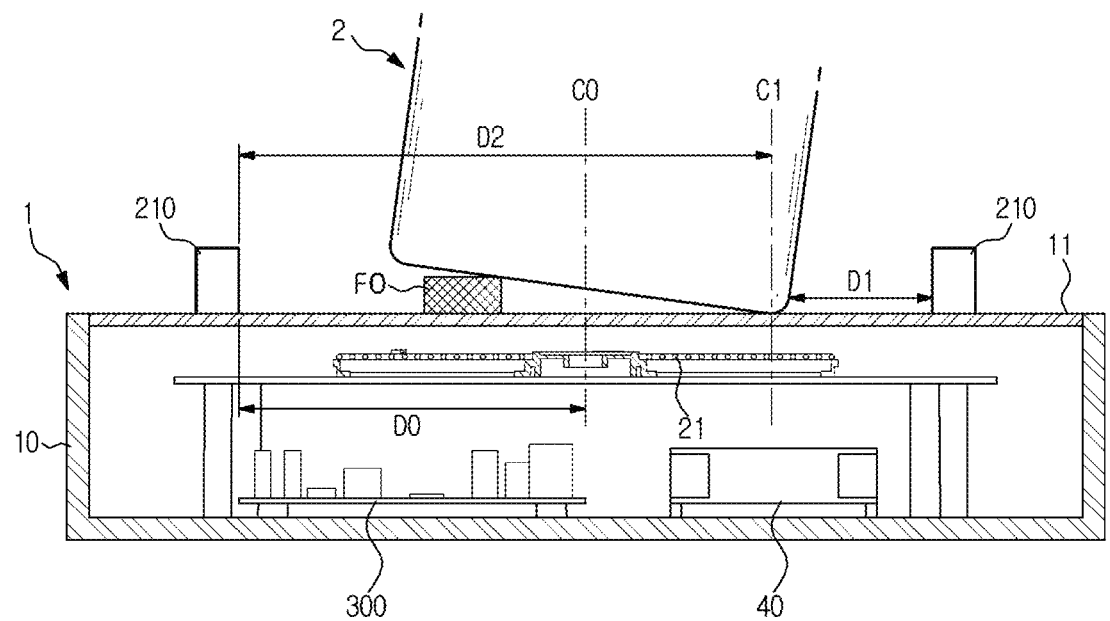
FIG. 8 is a view for describing the detection of a foreign material using a distance sensor.

FIG. 7 is a flowchart for describing a method of controlling a wireless power transmitting apparatus using a distance sensor. FIG. 8 is a view for describing the detection of a foreign material using a distance sensor.

Referring to FIG. 7, when a wireless power transmitting apparatus 1 is communicatively connected to a wireless device 2 (701), a controller 330 of the wireless power transmitting apparatus 1 may operate distance sensors 210 (702). The plurality of distance sensors 210 may be provided around a driving area M of a plate 11 and may acquire data about a distance to an object positioned on an upper surface of the plate 11 (703). The object may include the wireless device 2 and a foreign material.

The controller 330 may determine whether the foreign material is present between the plate 11 and the wireless device 2 based on the data about the distance acquired by the distance sensor 210. When a distance value exceeding a preset reference distance is checked in the data about the distance, the controller 330 may determine that the foreign material is present (704). In addition, the controller 330 may control a control panel 12 to block transmission of wireless power and output a request message to remove the foreign material (705).

On the contrary, when the distance value exceeding the reference distance is checked and not included in the data about the distance acquired by the distance sensor 210, the controller 330 may determine that the foreign material is not present between the plate 11 and the wireless device 2. When the foreign material is not present between the plate 11 and the wireless device 2, the controller 330 may control a driving circuit 320 to transmit wireless power to the wireless device 2 (706).

Referring to FIG. 8, the preset reference distance may be defined as a distance D0 from the distance sensor 210 to a center C0 of a transmitting coil 21. Specifically, the preset reference distance may be defined as the distance D0 from a light receiver 213 or lenses 214 and 217 of the distance sensor 210 to the center C0 of the transmitting coil 21.

In FIG. 8, two distance sensors 210 are illustrated as being positioned at a left side and a right side of the transmitting coil 21. A first distance sensor at the left side and a second distance sensor at the right side are positioned to face each other. In order to prevent crosstalk of infrared light, the controller 330 of the wireless power transmitting apparatus 1 alternately operates the two distance sensors 210.

When a foreign material FO is not present between the plate 11 of the wireless power transmitting apparatus 1 and the wireless device 2, a bottom surface of the wireless device 2 may be pressed against the plate 11. Accordingly, infrared light emitted from a light emitter 212 of the distance sensor 210 may not travel between the wireless device 2 and the plate 11 and may be reflected from a side surface of the wireless device 2.

In this case, the distance sensor 210 may acquire a distance D1 to the side surface of the wireless device 2 as data about a distance. The distance D1 from the distance sensor 210 to the side surface of the wireless device 2 is shorter than the reference distance D0. Since the data about the distance acquired by the distance sensor 210 includes only a distance value that is smaller than the reference distance D0, the controller 330 of the wireless power transmitting apparatus 1 may determine that the foreign material is not present between the plate 11 and the wireless device 2.

However, when the foreign material FO is present between the plate 11 of the wireless power transmitting apparatus 1 and the wireless device 2, the bottom surface of the wireless device 2 may not be pressed against the plate 11. In other words, a portion of the bottom surface of the wireless device 2 may be separated from an upper surface of the plate 11, and a space may be present between the bottom surface of the wireless device 2 and the plate 11.

In this case, infrared light emitted from the light emitter 212 of the distance sensor 210 may travel between the wireless device 2 and the plate 11. That is, the infrared light may travel to a contact point C1 between the bottom surface of the wireless device 2 and the plate 11. The distance sensor 210 may obtain a distance D2 to the contact point C1 between the bottom surface of the wireless device 2 and the plate 11 as data about a distance. The distance D2 from the distance sensor 210 to a point C2 is longer than the reference distance D0. Since the data about the distance acquired by the distance sensor 210 includes a distance value that exceeds the reference distance D0, the controller 330 of the wireless power transmitting apparatus 1 may determine that the foreign material is present between the plate 11 and the wireless device 2.

Meanwhile, there may be a case in which there is no contact portion between the bottom surface of the wireless device 2 and the plate 11 due to a foreign material. In other words, the entire bottom surface of the wireless device 2 may be spaced apart from the upper surface of the plate 11. In this case, all pieces of data about a distance acquired by the two distance sensors 210 may include distance values exceeding the reference distance D0. Since it can be regarded that the wireless device 2 is improperly placed, the controller 330 of the wireless power transmitting apparatus 1 may control a control panel 12 to output an error message.

Figure 9:
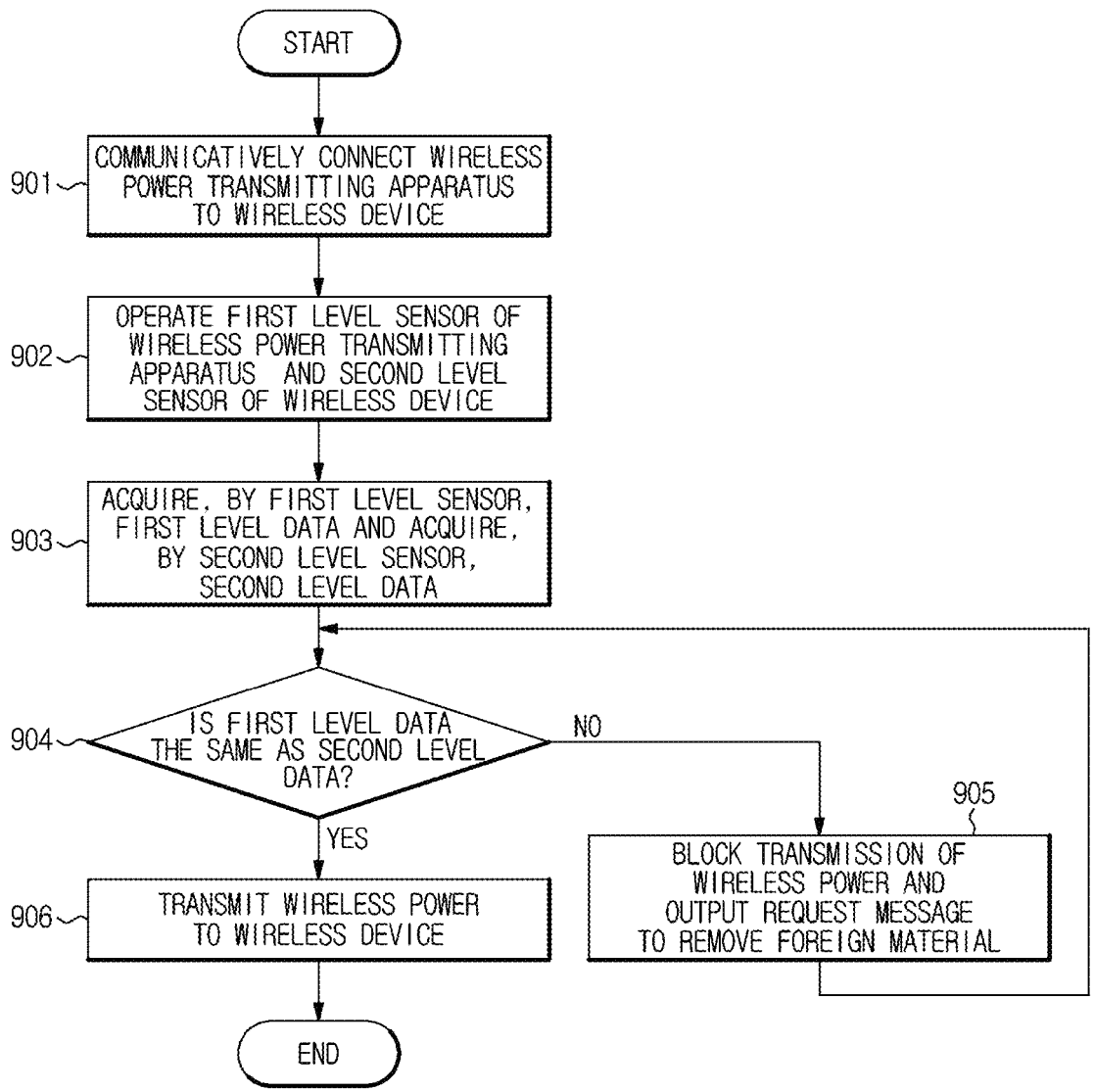
FIG. 9 is a flowchart for describing a method of controlling a wireless power transmitting apparatus using a level sensor according to one embodiment.
Figure 10:
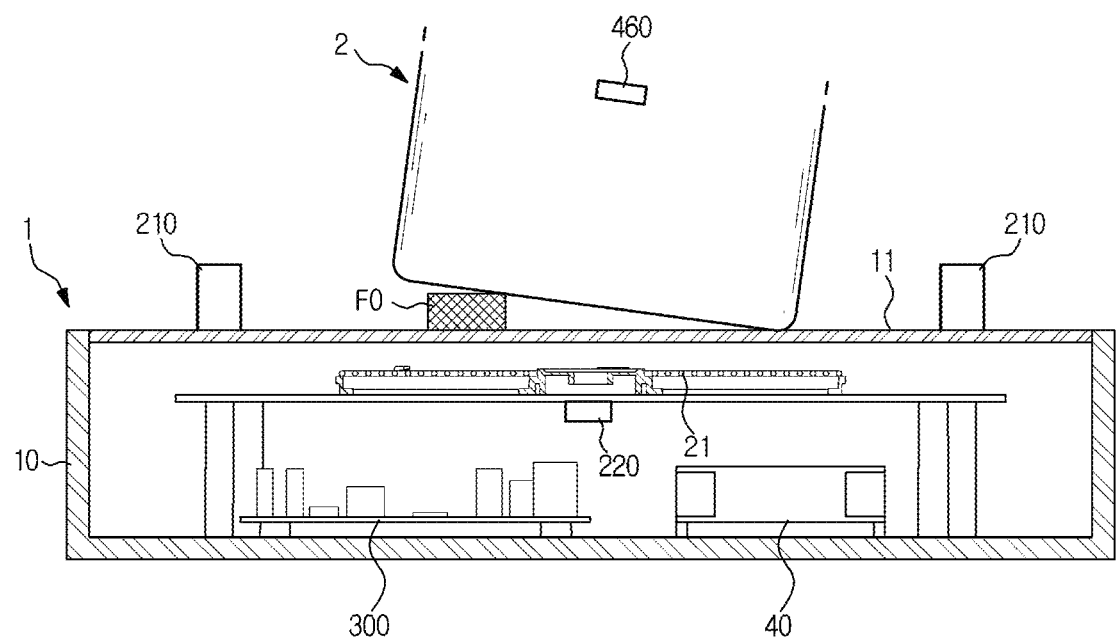
FIG. 10 is a view for describing the detection of a foreign material using a level sensor.

FIG. 9 is a flowchart for describing a method of controlling a wireless power transmitting apparatus using a level sensor. FIG. 10 is a view for describing the detection of a foreign material using a level sensor.

Referring to FIGS. 9 and 10, when a wireless power transmitting apparatus 1 is communicatively connected to a wireless device 2 (901), a controller 330 of the wireless power transmitting apparatus 1 may operate a first level sensor 220 of the wireless power transmitting apparatus 1 and a second level sensor 460 of the wireless device 2 (902). The first level sensor 220 may acquire first level data of the wireless power transmitting apparatus 1, and the second level sensor 460 may acquire second level data of the wireless device 2 (903). The controller 330 of the wireless power transmitting apparatus 1 may acquire the second level data from the wireless device 2 through a communication circuit 310.

The controller 330 of the wireless power transmitting apparatus 1 may determine whether a foreign material is present between a plate 11 and the wireless device 2 using the first level data and the second level data. Specifically, when there is a difference between the first level data and the second level data, the controller 330 of the wireless power transmitting apparatus 1 may determine that the foreign material is present between the plate 11 and the wireless device 2.

For example, the wireless power transmitting apparatus 1 is in a state of being horizontally placed (a state in which an upper surface of the plate 11 is perpendicular to the direction of gravity), but due to the foreign material present between the plate 11 and the wireless device 2, the wireless device 2 may be in a state of being inclined with respect to the upper surface of the plate 11 and a ground surface. In this case, there is a difference between the first level data acquired by the level sensor 220 of the wireless power transmitting apparatus 1 and the second level data acquired by the level sensor 460 of the wireless device 2.

When the foreign material is present between the plate 11 and the wireless device 2, the controller 330 may control a control panel 12 to block transmission of wireless power and output a request message to remove the foreign material (905).

On the contrary, when the first level data and the second level data are the same, the controller 330 of the wireless power transmitting apparatus 1 may determine that the foreign material is not present between the plate 11 and the wireless device 2. When it is determined that the foreign material is not present between the plate 11 and the wireless device 2, the controller 330 may control a driving circuit 320 to transmit wireless power to the wireless device 2 (906).

Meanwhile, when the wireless power transmitting apparatus 1 itself is inclined, the controller 330 may control the control panel 12 to output an error message. In other words, when the wireless power transmitting apparatus 1 is not placed perpendicular to the direction of gravity, an error message to guide a rearrangement of the wireless power transmitting apparatus 1 to a user may be output. Accordingly, it is possible to guide safe use of the wireless power transmitting apparatus 1.

Figure 11:
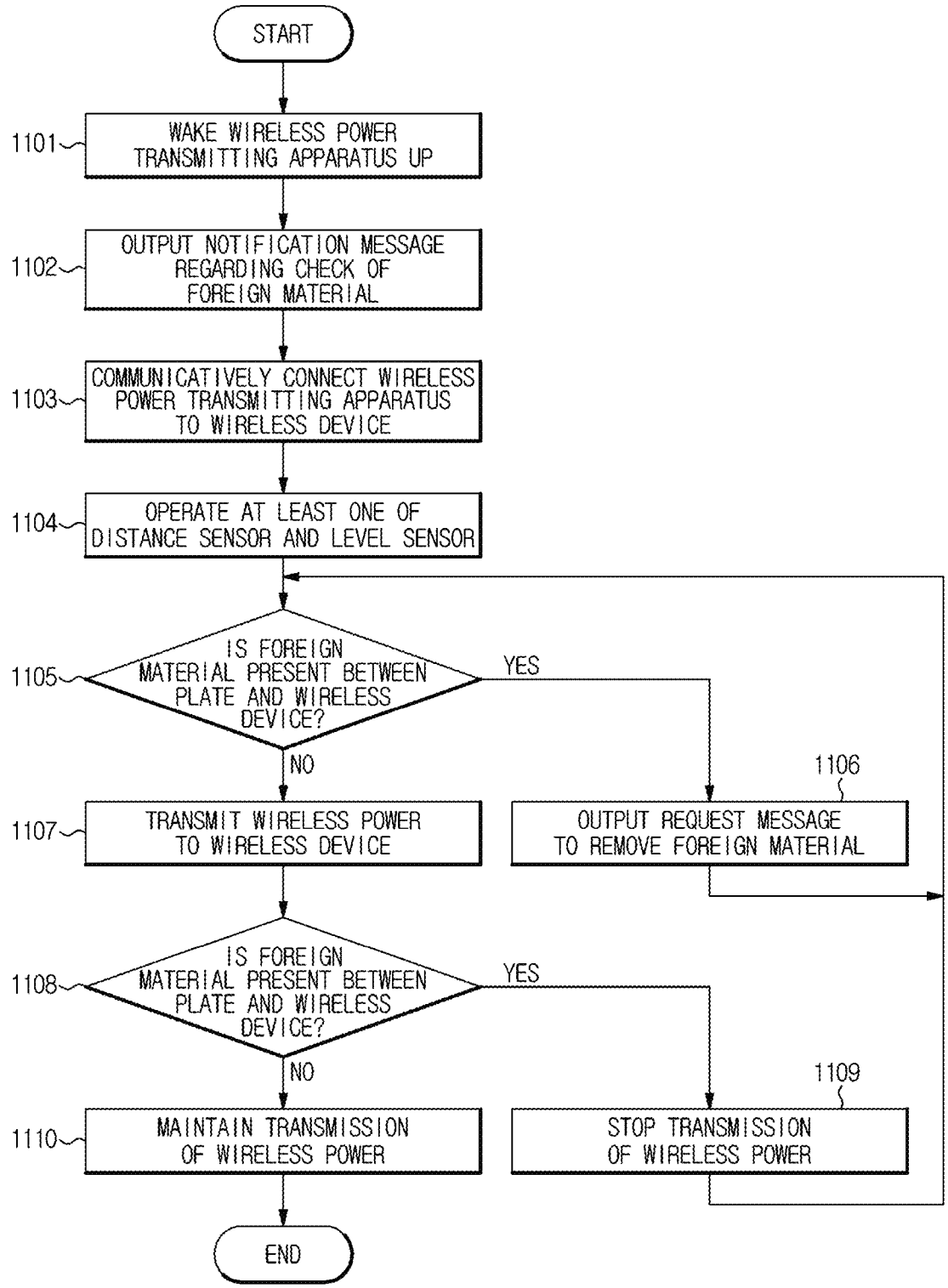
FIG. 11 is a flowchart for describing a method of controlling a wireless power transmitting apparatus according to one embodiment in more detail.

FIG. 11 is a flowchart for describing a method of controlling a wireless power transmitting apparatus according to one embodiment in more detail.

Referring to FIG. 11, a controller 330 of a wireless power transmitting apparatus 1 may wake the wireless power transmitting apparatus 1 up (1101). For example, the controller 330 may wake the wireless power transmitting apparatus 1 up based on a wakeup signal transmitted from a device sensor 120 or a control panel 12. A user may input a wakeup command of the wireless power transmitting apparatus 1 using the control panel 12. When a user input is input through a power-on button of the control panel 12, the control panel 12 may transmit the wakeup signal to the controller 330. In addition, when the device sensor 120 detects a wireless device 2, the device sensor 120 may transmit the wakeup signal to the controller 330.

When the wireless power transmitting apparatus 1 wakes up, the controller 330 may control the control panel 12 to output a notification message regarding a check for a foreign material (1102). In addition, when a communication circuit 310 is connected to an external mobile device 3, the controller 330 may control the communication circuit 310 to transmit the notification message regarding the check for the foreign material to the external mobile device 3. Accordingly, the notification message regarding the check for the foreign material may be output to the mobile device 3. In addition, when the wireless power transmitting apparatus 1 includes a speaker (not shown), the notification message may be output through the speaker (not shown). As described above, before the wireless power transmitting apparatus 1 is connected to the wireless device 2, a user may be notified to check for the foreign material, thereby guiding safe use.

Next, the wireless power transmitting apparatus 1 may be communicatively connected to the wireless device 2 (1103). The wireless power transmitting apparatus 1 may be connected to the wireless device 2 using various communication technologies. In addition, the wireless power transmitting apparatus 1 may be connected to the external mobile device 3. Preferably, the wireless power transmitting apparatus 1 may be connected to the wireless device 2 through NFC communication.

The controller 330 of the wireless power transmitting apparatus 1 may operate at least one of a distance sensor 210 and a level sensor 220 (1104). For example, when the wireless power transmitting apparatus 1 includes both the distance sensor 210 and the level sensor 220, according to settings, only the distance sensor 210 may be operated, only the level sensor 220 may be operated, or the distance sensor 210 and the level sensor 220 may be operated together.

The controller 330 of the wireless power transmitting apparatus 1 may determine whether a foreign material is present between a plate 11 and the wireless device 2 based on at least one of data about a distance acquired by the distance sensor 210 or level data acquired by the level sensor 220 (1105). After the wireless power transmitting apparatus 1 is communicatively connected to the wireless device 2, whether the foreign material is present between the plate 11 and the wireless device 2 is checked before wireless power is transmitted to the wireless device 2, hereby preventing device damage and guiding safe use.

When the foreign material is present between the plate 11 and the wireless device 2, the controller 330 of the wireless power transmitting apparatus 1 may control the control panel 12 to output a request message to remove the foreign material (1106). On the contrary, when the foreign material is not present between the plate 11 and the wireless device 2, the controller 330 may control a driving circuit 320 to transmit wireless power to the wireless device 2 (1107).

In addition, even while wireless power is transmitted to the wireless device 2, the controller 330 of the wireless power transmitting apparatus 1 may check whether the foreign material is present between the plate 11 and the wireless device 2 (1108). The distance sensor 210 may continue to be operated until an operation of the wireless device 2 is completed. In addition, the level sensor 220 may continue to be operated until the operation of the wireless device 2 is completed. Since a foreign material may enter between the plate 11 and the wireless device 2 even while wireless power is transmitted, energy loss can be prevented and the safety of a device can be secured through a continuous check for the foreign material.

When the foreign material is detected between the plate 11 and the wireless device 2 while wireless power is transmitted to the wireless device 2, the controller 330 of the wireless power transmitting apparatus 1 may control the control panel 12 to stop transmission of wireless power and output a request message to remove the foreign material (109 and 1106). On the contrary, when the foreign material is not detected between the plate 11 and the wireless device 2, the controller 330 may maintain transmission of wireless power (1110).

Figure 12:
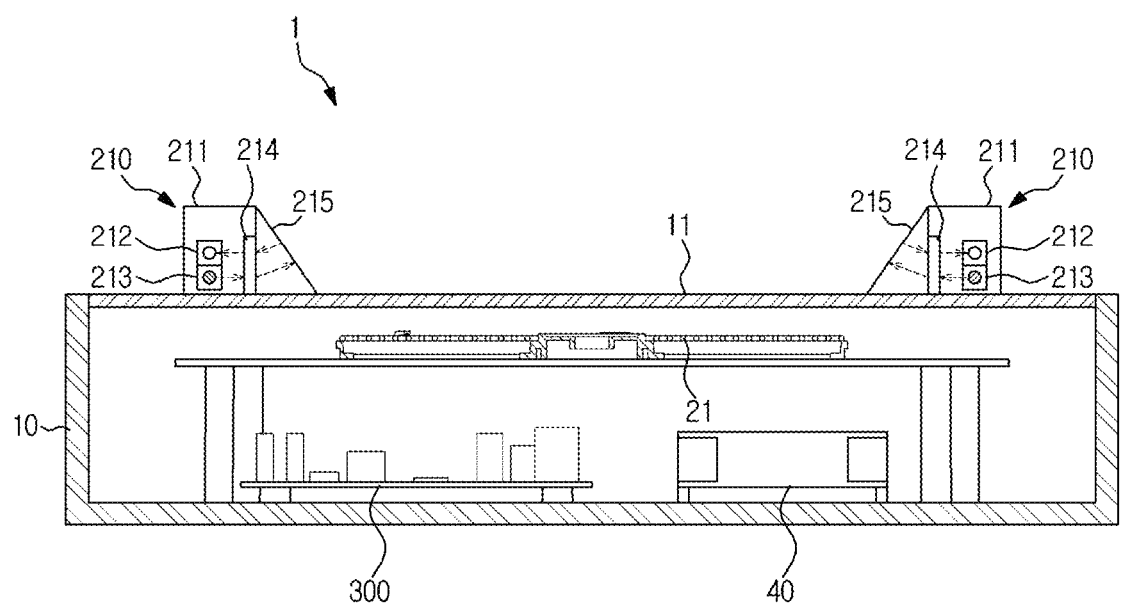
FIG. 12 illustrates a cross section of a distance sensor and a wireless power transmitting apparatus according to one embodiment.

FIG. 12 illustrates a cross section of a distance sensor and a wireless power transmitting apparatus according to one embodiment.

FIG. 12 illustrates distance sensors 210 that are a fixed type. Each of the plurality of distance sensors 210 includes a light emitter 212 which emits infrared light, a light receiver 213 which receives light reflected from an object, and a lens 214 which refracts infrared light and reflected light. The lens 214 may be made of a transparent material and may be implemented using a material having high light transmittance. An angle of the lens 214 may be adjusted automatically or manually.

The distance sensor 210 that is the fixed type may include a case 211 disposed on an upper surface of a plate 11. The case 211 may accommodate the light emitter 212, the light receiver 213, and the lens 214. The case 211 may be provided integrally with the plate 11 or may be provided detachably therefrom. The lens 214 may be provided on a surface of the case 211 which faces a driving area M.

In addition, the distance sensor 210 that is the fixed type may include a protective cover 215 provided to have an inclination or a curved surface between one surface of the case 211 and the upper surface of the plate 11. FIG. 12 illustrates the protective cover 215 provided as a flat plate inclined leftward or rightward from a direction perpendicular to the upper surface of the plate 11.

When dust or liquid is present in a traveling path of infrared light and reflected light, an object may be inaccurately detected, and an improper operation of the wireless power transmitting apparatus 1 may be caused. To prevent such problems, the protective cover 215 may be made of a transparent material that prevents the attachment of foreign materials and the permeation of liquid and has high light transmittance. For example, the protective cover 215 may include an antistatic agent. In addition, in order to facilitate the removal of foreign materials attached to the protective cover 215, the protective cover 215 may be provided to have an inclination with respect to the upper surface of the plate 11 or may be provided to have a curved surface.

Figure 13:
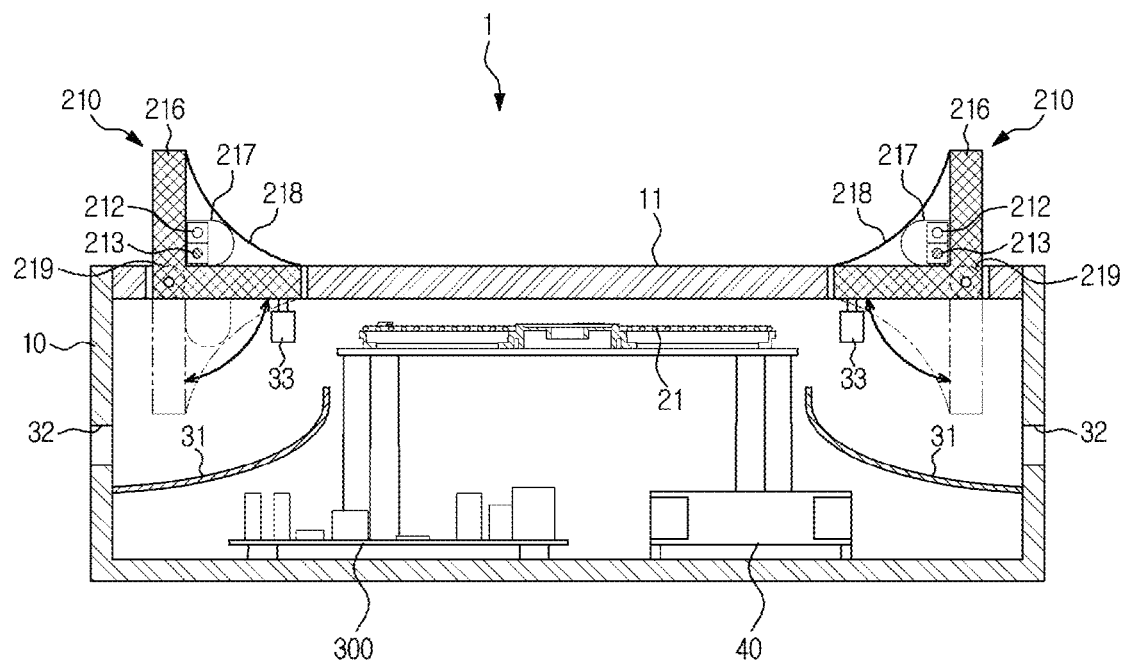
FIGS. 13 and 14 each illustrate a cross section of a distance sensor and a wireless power transmitting apparatus according to another embodiment.
Figure 14:
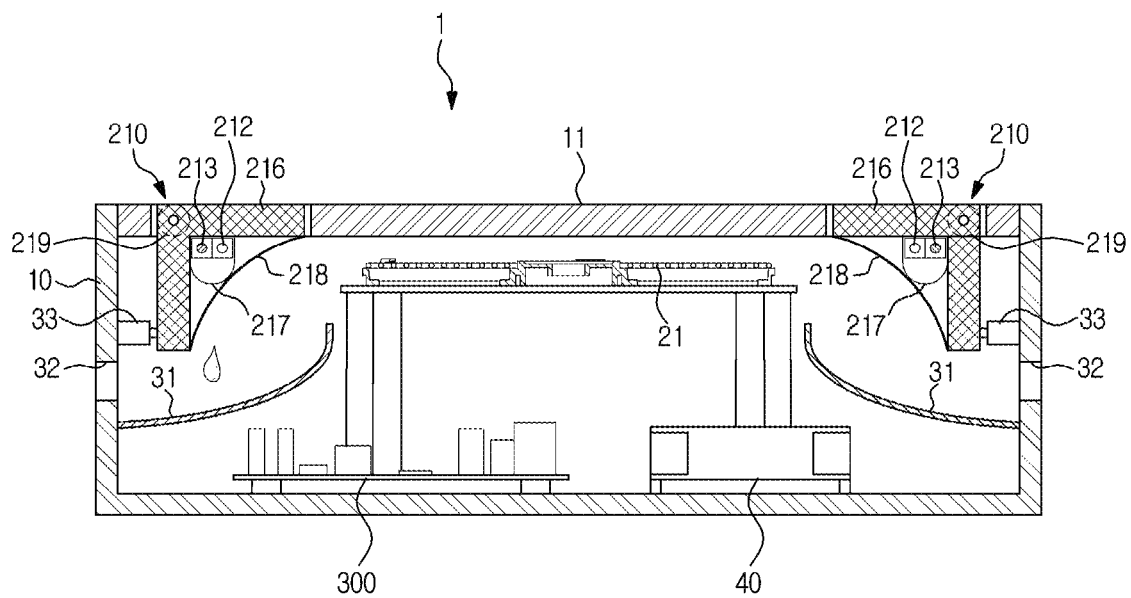

FIGS. 13 and 14 illustrate a cross section of a distance sensor and a wireless power transmitting apparatus according to another embodiment.

FIGS. 13 and 14 illustrate a distance sensor 210 that is a rotation sensor. The distance sensor 210 that is the rotation sensor may include a support 216 and a step motor 219. The support 116 may be rotatably provided on a plate 11, and a light emitter 212, a light receiver 213, and a lens 217 may be installed thereon. The support 116 may have a bent rod shape. For example, the support 116 may be provided in a shape of a capital letter L.

The step motor 219 may rotate the support 216 in a vertical direction passing through the plate 11. A rotation shaft of the support 216 may be positioned inside the plate 11. The step motor 219 may also be provided inside the plate 11. When a communication connection is made with a wireless device 2, a controller 330 of a wireless power transmitting apparatus 1 may control the step motor 219 to rotate the support 216 upward. In addition, when the wireless power transmitting apparatus 1 enters a standby mode, the controller 330 of the wireless power transmitting apparatus 1 may control the step motor 219 to rotate the support 216 downward.

After power is supplied from the wireless power transmitting apparatus 1 to the wireless device 2 to turn the wireless device 2 on, when a user operation is not detected for a preset time, the wireless power transmitting apparatus 1 and the wireless device 2 may enter a standby mode. In addition, after an operation of the wireless device 2 is ended, even when a user operation is not detected for a preset time, the wireless power transmitting apparatus 1 and the wireless device 2 may enter the standby mode. Furthermore, after the operation of the wireless device 2 is ended, when the wireless device 2 is removed from an upper surface of the plate 11 and thus is not detected, the wireless power transmitting apparatus 1 may enter the standby mode. The standby mode may be a low power consumption mode and may be defined as a mode in which power is supplied only to some components of the wireless power transmitting apparatus 1 and the wireless device 2. In the standby mode, the wireless device 2 is controlled to consume low power.

In other words, when an operation of the distance sensor 210 is required, the distance sensor 210 that is the rotation type may be rotated upward to protrude upward from the upper surface of the plate 11. On the contrary, when the operation of the distance sensor 210 is not required, the distance sensor 210 that is the rotation type may be rotated downward to be hidden inside the plate 11 or inside a housing 10. That is, when the operation of the distance sensor 210 is not required, the distance sensor 210 that is the rotation type may not be observed from the outside of the wireless power transmitting apparatus 1. Therefore, the entire upper surface of the plate 11 may be observed as a flat surface.

The distance sensor 210 that is the rotation type may also include a protective cover 218. The protective cover 218 may be provided to have an inclination or a curved surface between both ends of the support 216. The protective cover 218 may be made of a transparent material that prevents the attachment of foreign materials and the permeation of liquid and has high light transmittance. For example, the protective cover 218 may include an antistatic agent.

In addition, the distance sensor 210 that is the rotation type may further include a rotation sensor 33 which is provided at one end of the support 216 and detects a rotation state of the support 216. The controller 330 of the wireless power transmitting apparatus 1 may check whether the distance sensor 210 is normally operated based on rotation data of the rotation sensor 33. The rotation sensor 33 may be in contact with an inner wall of the housing 10 in a state in which the distance sensor 210 is not operated.

A drip rail 31 and a drain hole 32 may be provided in the housing 10 of the wireless power transmitting apparatus 1 including the distance sensor 210 that is the rotation type. The drip rail 31 may extend from the inner wall of the housing 10. When viewed from an upper surface of the wireless power transmitting apparatus 1, the drip rail 31 may extend to a position overlapping a hole of the plate 11 in which the distance sensor 210 is accommodated. The drip rail 31 is provided to be positioned below the distance sensor 210 and may have a curved surface. The drip rail 31 may receive a liquid falling from the distance sensor 210. Since the drip rail 31 is formed to have the curved surface, the liquid falling onto the drip rail 31 may flow into the drain hole 32 and may exit to the outside of the wireless power transmitting apparatus 1 through the drain hole 32.

Since the drip rail 31 and the drain hole 32 are provided, the wireless power transmitting apparatus 1 can be prevented from being damaged due to a liquid flowing into the housing 10 through the hole of the plate 11 in which the distance sensor 210 that is the rotation type is accommodated.

Meanwhile, a fan 40 is provided in the housing 10. The controller 330 of the wireless power transmitting apparatus 1 may control the rotation of the fan 40 to evaporate a liquid inside the housing. The liquid falling onto the drip rail 31 may be evaporated by heat inside the housing 10, and air containing heat may be moved by the rotation of the fan 40 to evaporate the liquid inside the housing 10.

As described above, according to the disclosed wireless power transmitting apparatus and method of controlling the wireless power transmitting apparatus, it is possible to detect a foreign material present between a wireless power transmitting apparatus and a wireless device, and it is possible to provide a notification regarding the foreign material. Therefore, it is possible to provide safe use guidance to a user.

In addition, according to the disclosed wireless power transmitting apparatus and method of controlling the wireless power transmitting apparatus, transmission of wireless power can be determined based on whether the foreign material is present between the wireless power transmitting apparatus and the wireless device. Accordingly, it is possible to prevent energy loss and device damage due to the foreign material.

Meanwhile, the disclosed embodiments can be implemented as recording media storing computer-executable instructions. The instructions can be stored in the form of program code and generate, when executed by a processor, a program module such that the operation of the provided embodiments can be performed.

A machine-readable storage medium may be provided in the form of a non-transitory storage medium. Here, the term "non-transitory" simply means that the storage medium is a tangible device and does not include a signal (for example, an electromagnetic wave), but this term does not differentiate between a case in which data is semi-permanently stored in the storage medium and a case in which the data is temporarily stored in the storage medium. For example, the "non-transitory storage medium" may include a buffer in which data is temporarily stored.

A method according to various embodiments disclosed in the present document may be included and provided in a computer program product. The computer program product may be traded as a product between a seller and a buyer. The computer program product may be distributed in the form of a machine-readable storage medium (for example, a compact disc read only memory (CD-ROM)) or be distributed (for example, downloaded or uploaded) online via an application store (for example, Play Store™), or between two user devices (for example, smart phones) directly. When distributed online, at least a part of a computer program product (for example, a download application (app)) may be temporarily generated or at least temporarily stored in a machine-readable storage medium, such as a memory of a manufacturer's server, a server of an application store, or a relay server.

The disclosed embodiments have been described above with reference to the accompanying drawings. It will be understood by those of ordinary skill in the art to which the disclosed embodiments belong that the disclosed embodiments can be implemented in different forms from the disclosed embodiments without departing from the spirit and scope of the disclosed embodiments. The disclosed embodiments are exemplary and should not be interpreted as restrictive.

Although the present disclosure has been described with various embodiments, various changes and modifications may be suggested to one skilled in the art. It is intended that the present disclosure encompass such changes and modifications as fall within the scope of the appended claims.

DESCRIPTIONS OF REFERENCE NUMERALS

1: wireless power transmitting apparatus
2: wireless device

10: housing
11: plate
M: driving area
12: control panel
20: coil layer
21: transmitting coil
30: driving layer
40: fan
50: heat sink
210: distance sensor
220: level sensor
300: driving assembly

What is claimed is:

1. A wireless power transmitting apparatus comprising:
a plate;
a communication circuit configured to communicate with a wireless device positioned on an upper surface of the plate;
a first distance sensor and a second distance sensor provided around a driving area of the plate and configured to acquire data about a distance to an object positioned on the upper surface of the plate;
a level sensor configured to acquire first level data;
a transmitting coil configured to transmit wireless power to the wireless device; and
a controller configured to:
acquire second level data from the wireless device through the communication circuit,
determine whether a foreign material is present between the plate and the wireless device based on the data about the distance, the first level data, and the second level data, and
determine whether to transmit the wireless power based on the determination of whether the foreign material is present,
wherein the first distance sensor and the second distance sensor protrude from the upper surface of the plate, and are positioned to face each other with the transmitting coil as a center.

2. The wireless power transmitting apparatus of claim 1, wherein the controller is further configured to, when a distance value exceeding a preset reference distance is checked in the data about the distance, determine that the foreign material is present and block the transmission of the wireless power.

3. The wireless power transmitting apparatus of claim 1, further comprising a control panel including a display,
wherein, the controller is further configured to, when the foreign material is present, control the control panel to output a request message to remove the foreign material.

4. The wireless power transmitting apparatus of claim 1, further comprising:
a control panel including a display; and
a device sensor configured to detect a position of the wireless device,
wherein the controller is further configured to, before a communication connection is made with the wireless device, control, based on a wakeup signal transmitted from the device sensor or the control panel, the control panel to output a notification message regarding a check for the foreign material.

5. The wireless power transmitting apparatus of claim 4, wherein the controller is further configured to, when the communication circuit is connected to an external mobile device, control the communication circuit to transmit the notification message regarding the check for the foreign material to the external mobile device.

6. The wireless power transmitting apparatus of claim 1, wherein the controller is further configured to, when there is a difference between the first level data and the second level data, determine that the foreign material is present and block the transmission of the wireless power.

7. The wireless power transmitting apparatus of claim 1, wherein:
the controller is further configured to alternately operate the first distance sensor and the second distance sensor.

8. The wireless power transmitting apparatus of claim 1, wherein each of the first distance sensor and the second distance sensor includes:
a light emitter configured to emit infrared light;
a light receiver configured to receive reflected light from the object;
a lens configured to refract the infrared light and the reflected light;
a case disposed on the upper surface of the plate and configured to accommodate the light emitter, the light receiver, and the lens; and
a protective cover provided to have an inclination or a curved surface between one surface of the case and the upper surface of the plate.

9. The wireless power transmitting apparatus of claim 1, wherein each of the first distance sensor and the second distance sensor includes:
a light emitter configured to emit infrared light;
a light receiver configured to receive reflected light from the object;
a lens configured to refract the infrared light and the reflected light;
a support which is rotatably provided on the plate, on which the light emitter, the light receiver, and the lens are installed, and which has a bent rod shape;
a step motor configured to rotate the support in a vertical direction passing through the plate; and
a protective cover provided to have an inclination or a curved surface between both ends of the support.

10. The wireless power transmitting apparatus of claim 9, wherein the controller is further configured to:
when a communication connection is made with the wireless device, control the step motor to rotate the support in an upward direction; and
when a standby mode is entered, control the step motor to rotate the support in a downward direction.

11. The wireless power transmitting apparatus of claim 9, wherein each of the first distance sensor and the second distance sensor further includes a rotation sensor provided at one end of the support and configured to detect a rotation state of the support.

12. The wireless power transmitting apparatus of claim 9, further comprising:
a housing configured to accommodate the plate, the communication circuit, the transmitting coil, and the controller;
a drip rail extending from an inner wall of the housing; and
a drain hole formed in the inner wall of the housing.

13. The wireless power transmitting apparatus of claim 12, further comprising a fan provided inside the housing,
wherein the controller is further configured to control rotation of the fan to evaporate a liquid inside the housing.

14. A method of controlling a wireless power transmitting apparatus, the method comprising:

performing a communication connection with a wireless device positioned on an upper surface of a plate;

operating a first distance sensor and a second distance sensor provided around a driving area of the plate, wherein the first distance sensor and the second distance sensor protrude from the upper surface of the plate, and are positioned to face each other with a transmission coil as a center;

acquiring, by the first distance sensor and the second distance sensor, data about a distance to an object positioned on the upper surface of the plate;

acquiring, by a level sensor, first level data;

acquiring second level data from the wireless device;

determining whether a foreign material is present between the plate and the wireless device based on the data about the distance, the first level data, and the second level data; and determining whether to transmit wireless power to the wireless device based on the determination whether the foreign material is present.

\* \* \* \* \*